(12) United States Patent
Nowak et al.

(10) Patent No.: US 6,503,965 B1
(45) Date of Patent: Jan. 7, 2003

(54) SOLVENT-BASED NON-FLUORESCENT INK FOR WRITING INSTRUMENTS BASED UPON PIGMENT DISPERSIONS IN NON-AQUEOUS SOLVENTS

(75) Inventors: Michael T. Nowak, Simpsonville, SC (US); Qingping Chen, Simpsonville, SC (US)

(73) Assignee: BIC Corporation, Milford, CT (US)

( * ) Notice: Subject to any disclaimer, the term of this patent is extended or adjusted under 35 U.S.C. 154(b) by 0 days.

(21) Appl. No.: 09/645,416

(22) Filed: Aug. 24, 2000

(51) Int. Cl.$^7$ ............... C09D 11/16; C08L 67/00; C08L 67/08
(52) U.S. Cl. ............................... 523/161; 524/601
(58) Field of Search .................. 523/160, 161; 106/31.6, 31.66, 31.89; 524/601

(56) References Cited

U.S. PATENT DOCUMENTS

| | | | | |
|---|---|---|---|---|
| 3,455,856 A | | 7/1969 | Vaedisch | 260/21 |
| 4,001,035 A | * | 1/1977 | Ito et al. | 524/594 |
| 4,077,727 A | * | 3/1978 | Kramer et al. | 401/215 |
| 4,079,026 A | | 3/1978 | Mone | 260/22 CQ |
| 4,383,860 A | | 5/1983 | Uhlemayr et al. | 106/27 |
| 4,404,318 A | | 9/1983 | Higuchi et al. | 524/588 |
| 4,410,643 A | * | 10/1983 | Muller | 523/161 |
| 4,657,591 A | * | 4/1987 | Shioi et al. | 106/31.58 |
| 4,721,739 A | * | 1/1988 | Brenneman et al. | 523/161 |
| 5,116,411 A | * | 5/1992 | O'Neill et al. | 524/141 |
| 5,167,704 A | | 12/1992 | Browe | 106/28 R |
| 5,288,316 A | | 2/1994 | Auslander et al. | 106/27 R |
| 5,580,374 A | * | 12/1996 | Okumura et al. | 524/84 |
| 5,702,512 A | | 12/1997 | Yano et al. | 106/31.75 |
| 5,756,561 A | * | 5/1998 | Wang et al. | 523/161 |
| 5,814,139 A | | 9/1998 | Beck et al. | 106/31.78 |
| 5,820,667 A | | 10/1998 | Lu et al. | 106/413 |
| 5,849,814 A | | 12/1998 | Fujita | 523/161 |
| 5,919,858 A | | 7/1999 | Loftin | 524/575 |
| 5,942,027 A | * | 8/1999 | Ikai et al. | 106/31.33 |
| 5,942,028 A | | 8/1999 | Tomiyn et al. | 106/31.78 |
| 5,965,633 A | | 10/1999 | Revol | 523/166 |
| 5,980,624 A | * | 11/1999 | Ichikawa | 106/31.58 |
| 6,398,441 B1 | | 6/2002 | Takayangi | 401/106 |

FOREIGN PATENT DOCUMENTS

| | | | |
|---|---|---|---|
| GB | 2314852 | * | 1/1998 |
| JP | 03243670 | * | 1/1991 |
| JP | 63008465 | * | 1/1998 |
| JP | 212496 | * | 8/2000 |
| WO | WO 86/00327 | * | 1/1986 |
| WO | WO00/20522 | | 4/2000 |

OTHER PUBLICATIONS

English Translation of JP 212496 (Aug. 2000).*
English Translation of JP 03243670 (1991).*

* cited by examiner

*Primary Examiner*—Vasu Jagannathan
*Assistant Examiner*—Callie E. Shosho
(74) *Attorney, Agent, or Firm*—Pennie & Edmonds LLP

(57) ABSTRACT

A non-aqueous non-fluorescent ink composition suitable for use in writing instruments is described comprising a non-fluorescent pigment dispersion, a stabilizer and a high boiling point organic solvent. The ink composition may also include resins, plasticizers, antiskinning agents and lubricants.

38 Claims, No Drawings

SOLVENT-BASED NON-FLUORESCENT INK FOR WRITING INSTRUMENTS BASED UPON PIGMENT DISPERSIONS IN NON-AQUEOUS SOLVENTS

FIELD OF INVENTION

The present invention relates to non-fluorescent ink compositions for writing instruments and writing instruments making use of the ink composition. The ink compositions comprise a non-fluorescent pigment dispersed in a resin, a stabilizer and a high boiling point organic solvent.

BACKGROUND OF INVENTION

Current non-aqueous writing instrument inks are in the great majority homogeneous in nature; that is, the colorant is soluble in the liquid medium of the ink. Heterogeneous non-aqueous writing instrument inks currently exist but constitute a very small portion of the total non-aqueous writing instrument market and are limited to a very narrow range of colors such as black, blue, red and green. Those skilled in the art of formulating writing instrument inks desire a way to extend the range of colorant possibilities into metallic, photochromic, thermochromic, pearlescent, inorganic, organic, luminescent and others. Many, if not all, of these desired colorants are insoluble in currently used solvents. There exists a need to make stable, non-aqueous dispersions of the broad range of possible insoluble colorants and to formulate these dispersions into inks suitable for writing instruments.

U.S. Pat. No. 3,455,856 to Voedisch discloses a printing ink and a method of manufacturing a pigment dispersion that contains pigmented resin particles suspended in an oil modified alkyd resin vehicle. Non-fluorescent dyestuffs are disclosed. U.S. Pat. No. 3,455,856 does not disclose the organic solvents of the present invention, nor does it disclose ink compositions for writing instruments, nor does it disclose the use of the stabilizers of the present invention.

U.S. Pat. No. 4,079,026 to Mone discloses oleoresinous base printing inks which contain pigments dispersed in an organic resin and an oil solvent. Non-fluorescent pigments are disclosed. Particularly preferred are oil solvents with boiling points about 200° C., such as those sold by Magie Bros. Oil Company. The ink is used for planographic or letterpress printing, not for writing instruments. Further, U.S. Pat. No. 4,079,026 does not disclose the stabilizers used in the present invention.

U.S. Pat. No. 4,383,860 to Uhlemayr et al. discloses a paper printing ink that includes a pigment and an non-drying alkyd resin binder modified with fatty-chain acids and/or fatty alcohols with an iodine number less than 20. The ink is used for lithoprinting, relief painting, or rotogravure, not for writing instruments as recited in the present invention. Further, U.S. Pat. No. 4,383,860 does not disclose a stabilizer which prevents the resin in the ink composition from polymerizing as does the present invention.

U.S. Pat. No. 5,167,704 to Brower discloses ink and paint compositions comprising pigment, non-petroleum based organic solvent and alkyd resin. The Brower invention requires that soy ink be included in the ink mixture, while the present invention does not require the use of soy ink. Further, the use of a non-petroleum based organic solvent is disclosed as resulting in faster drying speed. U.S. Pat. No. 5,167,704 does not disclose the non-drying solvents of the present invention, nor the use of stabilizers to prevent the drying of the ink.

U.S. Pat. No. 5,228,316 to Auslander et al. discloses a dispersion ink for use with an inking pad to reduce plugging in the pad. The ink contains a solvent, organic pigments dispersed in rosin esters and amino formaldehyde resin dispersed in an alkyd resin, and the resulting colors can be red, blue, green, or black. The ink is used for dispersion printing, not for writing instruments as in the present invention. Further, U.S. Pat. No. 5,228,316 does not disclose a stabilizer which prevents the resin in the ink composition from polymerizing.

U.S. Pat. No. 5,702,512 to Yano et al. discloses an oil ink composition for use in writing instruments. The composition includes titanium dioxide as the pigment, resin, and two other compounds, A and B, to re-disperse precipitated pigments. Compound A must contain at least one amide or amino group, and compound B must be formed of phosphoric acid or phosphate compound. Colored pigments, such as inorganic pigments, organic pigments and metal powder pigments, may also be added to the ink compositions of Yano. U.S. Pat. No. 5,702,512 does not disclose pigments dispersed in resin, nor does it disclose the use of stabilizers to prevent the drying of the ink.

U.S. Pat. No. 5,849,814 to Fujita discloses an eraseable ink composition for writing boards. The composition comprises a pigment, a pigment dispersion resin, non-aqueous ambient temperature non-volatile liquid removal agent and a non-aqueous ambient temperature volatile organic solvent, wherein the amount of pigment dispersion resin relative to pigment is from about 2 to about 10%. Non-fluorescent pigments are disclosed. U.S. Pat. No. 5,849,814 discloses the use of a volatile solvent at ambient temperature. Further, it states that the ink composition of Fujita is superior in time-erasion performance independent of the surface of the writing board. U.S. Pat. No. 5,849,814 does not disclose ink compositions for writing instruments, nor does it disclose high boiling point organic solvents, nor does it disclose writing surfaces other than writing boards.

U.S. Pat. No. 5,814,139 to Beck et al. discloses a process for preparing a water-free ballpoint pen paste comprising at least one phthalocyanine pigment, a customary ballpoint pen paste resin and organic solvent. U.S. Pat. No. 5,814,139 does not disclose a stabilizer which prevents the resin in the ink composition from polymerizing.

U.S. Pat. No. 5,919,858 to Loftin discloses erasable ink compositions comprising an aqueous-based marking ink comprising water, a colorant and a latex emulsion comprising a styrene-butadiene copolymer having a styrene content of less than about 35%. Pigments such as carbon blacks and Prussian blues are disclosed. U.S. Pat. No. 5,919,858 does not disclose the non-aqueous compositions of the present invention.

U.S. Pat. No. 5,942,027 to Ikai et al. discloses a ballpoint pen ink that contains organic solvents, colorants, resins and fine particle silica with primary average particle diameters of 7 to 40 nm and specific surface areas (BET method) of 50 to 380 $m^2/g$. Inorganic pigments, such as titanium oxide, carbon black and metal powder, and organic pigments, such as azo lakes, insoluble azo pigments, chelate azo pigments, phthalocyanine pigments, perylene pigments, anthraquinone pigments, quinacridone pigments, dye lakes, nitro pigments and nitroso pigments, are disclosed. Inks with a viscosity of 1000 to 5000 mPas at 25° C. are also disclosed. U.S. Pat. No. 5,942,027 does not disclose a pigment dispersed in a resin or the use of a stabilizer to prevent ink drying as recited in the present invention.

U.S. Pat. No. 5,942,028 to Tomiya et al. discloses a method for producing a β-form copper phthalocyanine pigment printing ink which comprises copper phthalocyanine and a printing ink resin. U.S. Pat. No. 5,942,028 does not disclose ink compositions for writing instruments, nor does it disclose a stabilizer which prevents the resin in the ink composition from polymerizing.

U.S. Pat. No. 5,965,633 to Revol discloses a lithographic printing ink containing an alkali soluble or dispersible binder material which is the reaction product of an acid functional hard resin with a fatty ester oil and/or an alkyd resin. U.S. Pat. No. 5,965,633 does not disclose ink compositions for writing instruments, nor does it disclose a stabilizer which prevents the resin in the ink composition from polymerizing.

The manufacture of lithographic printing inks is distinct from that of handwriting inks. For lithographic printing inks, one objective is for the ink to dry as soon as the ink is printed. For instance, ink chemists normally wish the ink to dry or cure as quickly as possible so that the printed article may be handled and bound (as in a magazine or book) without the ink's rubbing or smearing off the printed sheet. Accordingly, additives are added to polymerize the alkyd resin or to react with air (e.g. using metal driers such as cobalt, manganese, lead napthenates put into the ink) after the ink is printed. This is distinct from the objective in handwriting inks which is to keep the ink from drying so that it lasts in the writing instrument. The present invention addresses this need.

There is a need for a writing instrument ink that contains many different types of insoluble colorants. This invention overcomes the problems associated with dispersing these colorants and stabilizing, against polymerization, the resin used to disperse these colorants so that a usable writing ink can be made which is deliverable using conventional writing instruments.

SUMMARY OF INVENTION

The ink of the present invention discloses heterogeneous non-aqueous, non-fluorescent ink that can be used in conventional writing instruments. In particular, the ink contains a wide and varied range of insoluble colorants dispersed in a resin. More particularly, the resin used to disperse these colorants is an alkyd. Even more particularly, this resin/colorant dispersion when used in the ink is stabilized against curing or polymerization by using antioxidants.

In one embodiment of the invention, a non-fluorescent ink composition for a writing instrument comprises a non-fluorescent pigment dispersed in a resin, a stabilizer and a high boiling point organic solvent, wherein the stabilizer of the ink composition prevents the resin from polymerizing and the ink composition has a viscosity usable for a writing instrument. The preferred resin to disperse these pigments is an alkyd resin. To use alkyd resins in inks used for writing instruments, stabilizers must be used to prevent an alkyd from polymerizing to form a hard, insoluble film. If the alkyd polymerizes in a writing instrument, the writing instrument becomes non-functional; i.e. non-writing.

The ink compositions of the present invention are heterogeneous, not homogeneous.

The non-fluorescent pigment may be used alone or in the form of a mixture of two or more non-fluorescent pigments. Preferably, the non-fluorescent pigment is present in the ink composition in amounts from about 0.1 to about 60 weight percent of the ink composition. Preferably, the non-fluorescent pigment is selected from the group consisting of organic pigments, inorganic pigments, metallic pigments, phosphorescent pigments, photochromic pigments, thermochromic pigments, iridescent pigments, pearlescent pigments and liquid crystal pigments.

Preferably the viscosity of the ink composition of the present invention is less than 500,000 cPs at 20° C. More preferably the viscosity of the ink composition of the present invention is from about 1000 to about 50,000 cPs at 20° C.

The resin in which the non-fluorescent pigment is dispersed may be present alone or as a mixture of resins. Preferably, the resin is an alkyd resin, more preferably, the alkyd resin is an oil-modified alkyd resin. Preferably, the ink composition comprising the non-fluorescent pigment dispersed in an alkyd resin further comprises antioxidant stabilizers, such as BHT (butylated hydroxy toluene), oximes, hydroquinones and vitamin E.

The organic solvent may be used alone or in the form of a mixture between two or more organic solvents. Preferably, the boiling point of the organic solvent is above 100° C. Examples of solvents include, but are not limited to, hydrocarbons, alcohols, polyols, polyol ethers, ketones, pyrrolidones, lactones or mixtures thereof. Preferably, the hydrocarbon solvent is selected from the group consisting of aliphatic hydrocarbons, napthenic hydrocarbons and aromatic hydrocarbons and mixtures thereof. Preferably, the organic solvent is present in an amount from about 1 to about 90 weight percent of the ink composition. Most preferably, the organic solvent is present in an amount from about 20 to about 65 weight percent of the ink composition.

The stabilizer may be used alone or in the form of a mixture of two or more stabilizers. Preferably, the stabilizer is hydroquinone. Preferably, the stabilizer is present in the ink composition from about 0.1 to about 30 weight percent of the ink composition. More preferably, the stabilizer is present in an amount from about 0.1 to about 10 weight percent of the ink composition.

In another embodiment of the invention, a non-fluorescent ink composition comprises a non-fluorescent pigment dispersion in a high boiling point organic solvent, a stabilizer and an antioxidant. Preferably, the antioxidant is present in an amount from about 0.1 to about 30 weight percent of the ink composition. More preferably, the antioxidant is present in an amount from about 0.1 to about 10 weight percent of the ink composition. Preferably, the antioxidant is selected from the group consisting of tocopherals, butylated hydroxy toluene, eugenol and hydroquinone.

In another embodiment of the invention, a non-fluorescent ink composition comprises a non-fluorescent pigment dispersion in a high boiling point organic solvent, a stabilizer and a second resin. The second resin may be used alone or in the form of a mixture of two or more resins. Preferably, the second resin is present in an amount from about 0.1 to about 50 weight percent of the ink composition. More preferably, the second resin is present in an amount from about 1 to about 20 weight percent of the ink composition.

Preferably, the second resin is selected from the group consisting of polyesters, polystyrene, high impact polystyrene, styrene copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, rosin esters, hydrocarbon resins, copolymers, grafts, blends, and mixtures thereof.

In another embodiment of the invention, the non-fluorescent ink composition comprises a non-fluorescent pigment dispersion in a high boiling point organic solvent, a stabilizer and a plasticizer. The plasticizer may be used alone or in the form of a mixture of two or more plasticizers. Preferably, the plasticizer is 2,2,4-trimethyl-1,3-pentanediol diisobutyrate. Preferably, the plasticizer is present in an amount from about 0.1 to about 40 weight percent of the ink composition, more preferably, from about 1 to about 20 weight percent and most preferably, from about 2 to about 15 weight percent.

Ink compositions of the present invention may further comprise lubricants, metal deactivators, chelating agents, dispersing agents and antiskinning agents, solely or mixtures thereof. Preferably, the antiskinning agent is present in an amount from about 0.1 to about 2 weight percent of the ink composition. The antiskinning may be used alone or in the form of a mixture of two or more antiskinning agents. Preferably, the antiskinning agent is an oxime. Most preferably, the antiskinning agent is methyl ethyl ketoxime. The lubricant may be used alone or in the form of a mixture of two or more lubricants. Preferably, the lubricant is selected from the group consisting of alcohol esters, amides, polyol esters, fatty acids, fatty alcohols, silicones, liquid polyolefins and fatty acid metal salts. Most preferably, the lubricant is liquid polyethylene wax. Preferably, the lubricant is present in an amount from about 0.1 to about 30 weight percent of the ink composition. More preferably, the lubricant is present in an amount from about 1 to about 15 weight percent of the ink composition. The total amount of such additional components is typically from about 0.1 weight percent to about 30 weight percent and, preferably, from about 0.1 weight percent to about 10 weight percent.

In another embodiment of the present invention, a writing instrument comprises an ink storage member or tube containing inks of the present invention. An ink storage member or tube may be made from any of the following polymer materials: polyesters, polystyrene, high impact polystyrene, styrene-butadiene copolymers, impact modified styrene-butadiene copolymer, styrene acrylonitrile copolymers, acrylonitrile butadiene copolymers, polyisobutylene, vinyl, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, such as nylon, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, fluoropolymers, copolymers, grafts, blends, and mixtures thereof. Also, any ink member or tube made from the polymers listed above may also be modified by a surface treatment such as fluorination, corona oxidation and the like to improve performance of the ink delivery. Preferably, the ink storage member is made of a polymer material such as fluoropolymer, vinyl, nylon and fluorinated polypropylene.

Many colors (and blends) and optical effects are envisioned in the present invention. Further, the inks of the present invention exhibit a smooth writing performance.

DESCRIPTION OF PREFERRED EMBODIMENTS

As used herein, the term "non-fluorescent pigment dispersion" is an insoluble non-fluorescent colorant dispersed in resin or mixture of resins. Because the colorant is dispersed in a resin, the non-fluorescent pigment dispersion is a heterogeneous ink composition, as opposed to a homogeneous ink composition.

As used herein, the term "alkyd resin" is a synthetic resin formed by the condensation of polyhydric alcohols, such as glycerol, and polybasic acids, such as phthalic anhydride. As used herein, the term "oil-modified alkyd resin" is an alkyd resin in which the polybasic acid is substituted in part by a monobasic acid.

As used herein, the term "stabilizer" is an additive for inks to prevent the polymerization of the ink along with preventing the discoloration and viscosity change within the bulk ink with the passage of time. Examples of stabilizers are dihydroxybenzene derivatives, hydroxybenzenes, such as butylated hydroxy toluene, and hydroquinone.

As used herein, the term "plasticizer" is an organic additive and is used to make the ink film more flexible. Examples of plasticizers are nonvolatile organic liquids and low melting solids, such as phthalate, adipate and sebacate esters, tricresyl phosphate and castor oil.

As-used herein, the term "antiskinning agent" is a liquid antioxidant used to inhibit the formation of an oxidized film on the exposed surface of the ink.

As used herein, the term "high boiling point solvent" is a solvent with a boiling point above 100° C. or 212 F. Preferably, the boiling point is from about 200° C. to 700° C. Preferably, the organic solvent is present in an amount from about 5 to about 50 weight percent of the ink composition. Preferred solvents are Magiesol solvents (Magie Brothers, Franklin Park, Ill.) such as Magiesol 470 oil, Magiesol 52 oil, Magiesol 62 oil, and Magiesol 60. Magiesol 470 oil is a sweetened middle distillate with a boiling point ranging from 230 to 280° C. Magiesol 52 oil is a blend of sweetened middle distillate and technical white oil with a boiling point from 270 to 310° C. Magiesol 62 and 60 are technical grade white oil with a boiling point from 300° C. to 400° C.

As used herein, the term "pigment" refers to an insoluble solid which remains insoluble throughout the coloration process.

As used herein, the term "luster" refers to the reflection of light rays in one direction. Matt, dull surfaces scatter light rays in many directions while a smooth, flat surface will scatter light in fewer directions or even one direction.

As used herein, the term "iridescent" refers to the result of the interference of light rays from the surface of a transparent, thin layer.

As used herein, the term "luminescent pigment", also known as "phosphorescent pigment" refers to pigments that glow in the dark. Specifically, phosphorescent pigments store energy during exposure to illumination, such as daylight or UV radiation, and release the radiation as visible light when the illumination is cut off.

The term "about," as used herein in connection with one or more numbers or numerical ranges, should be understood to refer to all such numbers, including all numbers in a range.

The preferred compositions comprise a non-fluorescent pigment dispersion in a high boiling point organic solvent and a stabilizer. A non-fluorescent pigment dispersion is an insoluble non-fluorescent colorant dispersed in a liquid medium. Any resin may be used, preferably an alkyd resin, most preferably, an oil modified alkyd resin. The preparation of a non-fluorescent pigment dispersion is known to one skilled in the art. Examples of making a non-fluorescent pigment dispersion are disclosed in U.S. Pat. No. 4,404,318 to Higuchi, et al and U.S. Pat. No. 5,820,667 to Lu. et al.

The non-fluorescent pigment may be used alone or in the form of a mixture of two or more non-fluorescent pigments. Preferably, the non-fluorescent pigment is present in the ink composition in amounts from about 0.1 to about 60 weight percent of the ink composition. Preferably, the non-fluorescent pigment is selected from the group consisting of organic pigments, inorganic pigments, metallic pigments, phosphorescent pigments, photochromic pigments, thermochromic pigments, iridescent pigments, pearlescent pigments and liquid crystal pigments.

The amount of pigment depends upon the desired color. Pastel colors are achieved with the addition of titanium dioxide white or a similar white pigment to a colored pigment.

Organic pigments can generally be divided into three classes: pigment dyestuffs, toners and lakas. Organic pigments suitable for the present invention include, but are not limited to, (1) azo pigments, such as para reds, pigment red 6, toluidine reds, naphthol reds, a naphthol maroon precipitated azo, pyrazolone reds, dinitroaniline orange, pyrazolone orange, hansa yellows and diarylide (supplied by BASF in Charlotte, N.C., Ciba Specialty Pigments in Newport, Del. and Sun Chemical Company in Cincinnati, Ohio); (2) precipitated azo or metallized azo pigments, such as lithol reds, lithol rubine B (BON pigment), permanent red 2B (BON pigment), lithol red 2G (BON pigment), yellow BON maroon, Lake Bordeaux and nickel azo yellow (supplied by BASF in Charlotte, N.C., Ciba Specialty Pigments in Newport, Del. and Sun Chemical Company in Cincinnati, Ohio); (3) condensation azo pigments, such as Cromophtal (Ciba-Geigy); (4) basic dye pigments, such as ketonimes, thiazines, xanthenes and triarylmethanes; (5) phthalocyanine pigments (supplied by BASF in Charlotte, N.C., Ciba Specialty Pigments in Newport, Del. and Sun Chemical Company in Cincinnati, Ohio); (6) quinacridone pigments, such as 2,9-dimethyl quinacridone, quinacridonequinone, and 4,11-dichloroquinacridone (supplied by Ciba Specialty Pigments in Newport, Del. and Sun Chemical Company in Cincinnati, Ohio); (7) thio-indigo pigments, such as 4,4'-dichloro-7,7'-dimethylthioindigo, 4,4',7,7'-tetra chlorothioindigo, 5,5'-dichloro-7,7'-dimethylthioindigo (supplied by BASF in Charlotte, N.C., Ciba Specialty Pigments in Newport, Del. and Sun Chemical Company in Cincinnati, Ohio); (8) perinones or diimides of naphthalene, such as perinone orange (supplied by BASF in Charlotte, N.C., Ciba Specialty Pigments in Newport, Del. and Sun Chemical Company in Cincinnati, Ohio); (9) perylenes, such as perylene maroon and perylene bordeaux and (10) anthraquinones, such as indanthrone blue, isodibenzanthrone violet and anthra pyrimidine yellow (supplied by BASF in Charlotte, N.C., Ciba Specialty Pigments in Newport, Del. and San Chemical Company in Cincinnati, Ohio).

Inorganic pigments can generally be divided into the following classes: (1) iron oxides, (2) chromium oxides, (3) chromate pigments, which are mixtures of $PbCrO_4$, $PbSO_4$, PbO and $PbMoO_4$, (4) titanium dioxide mixed-phase pigments, (5) cadmiums, (6) ultramarine pigments, (7) iron cyanogen blue pigments and (8) carbon blacks. Inorganic pigments suitable for the present invention include, but are not limited to, (1) iron oxide pigments (made by Bayer Corporation in Pittsburgh, Pa. and Cleveland Pigment and Color in Cleveland, Ohio) such as Persion Gulf red oxide, Spanish oxide siennas, burnt siennas, ochers, Turkey umber, burnt umber, calcination of limonite and siderite and magnetite; (2) chromium oxide pigments (made by Ceramic Color and Chemical Mfg. Corp. in New Brighton, Pa. and Ferro Corp in Cleveland, Ohio); (3) chromate pigments (made by Cleveland Pigment and Color in Cleveland, Ohio and Johnson Matthey in Dowington, Pa.), such as primrose chrome yellow, light (lemon) chrome yellow, medium yellow, chrome orange (light and dark) and molybdate orange; (4) titanium dioxide (made by Kemira Pigments in Savannah, Ga. and Ishihara Corp. USA in San Francisco, Calif.) and mixed-phase titanium dioxide pigments (made by Ceramic Color and Chemical Mfg. Corp. in New Brighton, Pa. and Ferro Corp in Cleveland, Ohio), i.e. mixtures obtained by incorporating foreign ions into a lattice of titanium dioxide; (5) cadmium pigments, obtained, for example, by co-precipitating barium sulphate with concentrated pigments; (6) ultramarine pigments (made by Ferro Corporation in Cleveland, Ohio and Cleveland Pigment and Color in Cleveland, Ohio), which are aluminum silicates having the general formula, $Na_8Al_6Si_6O_{24}S_{(2-4)}$ and (7) iron blue pigments (made by Johnson Matthey in Dowington, Pa. and Degussa-Huls in Belpre, Ohio), which consist of alkaline iron salts of iron-cyanogen hydrogen acid which contains divalent as well as trivalent iron, such as Milori, Chinese, Prussian and toning blues.

Metallic pigments are typically prepared from metallic elements and their alloys, e.g., aluminum, copper, bronze and zinc. Metallic pigments suitable for the present invention include, but are not limited to, (1) aluminum flake pigments, leafing or nonleafing, (made by Silberline in Tamaqua, Pa., and MD-Both Industries in West Chicago, Ill.); (2) bronze pigments (made by U.S. Bronze Powders In Flemington, N.J.) and (3) zinc dust (made by Meadowbrook Company, New York, N.Y. and R.E. Carroll, Inc. in Trenton, N.J.). Leafing aluminum flakes are typically produced by using stearic acid as the milling lubricant in the manufacture of the leafing aluminum flake pigments. For non-leafing aluminum flakes, a long-chain, unsaturated fatty acid, such as oleic acid, is used. The leafing and non-leafing properties of the aluminum flake pigments have been shown to be due to the differences in the interfacial tension between the vehicle and the monomolecular layer of fatty acid, coated on the aluminum flake. Preferably, the thickness of the aluminum flake pigments ranges in size from about 0.1 to about 2 micron. Preferably, the diameter of the aluminum flake pigments ranges in size from about from about 1 to 200 micron.

Carbon black pigments (made by Cabot Corporation in Billerica, Mass., and Degussa-Huls in Belpre, Ohio) are composed of nearly pure carbon of colloidal dimensions. Different grades of carbon blacks vary with respect to average particle sizes. Particle size of the carbon black ranges from about 1 nm to about 500 nm. For example, high-color channel carbon black has a particle diameter range of 100–140 Å, medium-color channel carbon black has a particle diameter range of 160–270 Å, medium-color furnace carbon black has a particle diameter range of 170–270 Å, two-color furnace carbon black has a particle diameter range of 290–700 Å and thermal black has a particle diameter range of 2250–3000 Å. The carbon black may be manufactured using a furnace process, impingement (channel or roller), thermal, lampblack and acetylene thermal cracking. Carbon black pigments suitable for the present invention include, but are not limited to, high-color channel carbon black, medium-color channel carbon black, medium-color furnace carbon black, two-color furnace carbon black, thermal blacks, graphite, bone blacks, vegetable blacks, and mineral blacks.

Pearlescent pigments suitable for the present invention include, but are not limited to, Iriodin® (EM Industries, Hawthorne, N.Y.) Silverwhite pigments (100 series) which consist of mica surrounded by a relatively thin titanium dioxide layer; Iriodin® Interference pigments (200 series); Iriodin® gold lustre pigments (300 series) which consist of a mica nucleus covered with a layer of titanium dioxide and an iron oxide layer; Iriodin® metallic lustre pigments (500 series) which consist of a mica nucleus covered with an iron oxide layer and Irioding® WR pigments (9000 series).

Luminescent or phosphorescent pigments are largely composed of zinc sulphide and zinc-cadmium sulphide. Luminescent pigments are slightly coarser than metallic pigments and are either colorless or have pastel shades. Luminescent pigments suitable for the present invention include, but are not limited to LUMILUX® N-pigments which emit yellow-green light, LUMILUX® Z pigments which emit a bluish light, LUMILUX® R pigments, LUMILUX® B pigments, LUMILUX® Q pigments, LUMILUX® CD pigments and LUMILUX® R Effect—pigments. LUMILUX® pigments are available from Riedel-de Haën (Seelze, GE).

Examples of photochromic pigments suitable for the present invention include, but are not limited to, spirooxazine-type compounds, spiropyran-type compounds and pyran-type compounds. Examples of spirooxazine-type compounds include 1,3,3-trimethylspiro[indoline-2,3'-(3H) naphtho(2,1-b)(1,4)-oxazine], 5-chloro-1,3,3-trimethylspiro [indoline-2,3'-(3H)naphtho(2,1-b)(1,4)-oxazine] and 1,3,3, 5-tetramethylspiro[indoline-2,3'-(3H)naphtho(2,1-b)(1,4)-oxazine]; 1,3,3-timethyl-9'-methoxyspiro[indoline-2,3'-(3H)naphtho(2,1-b)(1,4)-oxazine], 1,3,3,5-tetrarmethyl-9'-methoxyspiro[indoline-2,3'-(3H)naphtho(2,1-b)(1,4)-oxazine] and 1,3,3,5,6-pentamethyl-9'-methoxyspiro [indoline-2,3'-(3H)naphtho(2, 1-b)(1,4)-oxazine]; 4-trifluoromethyl-1,3,3-trimethyl-5'-methoxyspiro [indoline-2,3'-(3H)naphtho(2,1-b) (1,4)-oxazine], 6'-trifluoromethyl-1,3,3,-trimethyl-5'-methoxyspiro [indoline-2,3'-(3H) naphtho(2,1-b)(1,4)-oxazine] and 4-trifluoromethyl-1,3,3-trimethyl-9'-methoxyspiro [indoline-2,3'-(3H)naphtho(2,1-b) (1,4)-oxazine]; 1,3,5,6-tetramethyl-3-ethylspiro[indoline-2,3'-(3H)pyrido(3,2-f)(1, 4)-benzooxazine], 1,3,3,5,6-pentamethylspiro[indoline-2,3'-(3H)pyrido(3,2-f)(1,4)-benzooxazine] and 1-methyl-3,3-diphenylspiro[indoline-2,3'-(3H)pyrido(3,2-f)(1,4-benzooxazine]; 1-benzyl-3,3-dimethylspiro[indoline-2,3'-(3H)naphtho(2,1-b)(1,4)-oxazine], 1-(4-methoxybenzyl)-3, 3-dimethylspiro[indoline-2,3'-(3H)naphtho (2,1-b)(1,4)-oxazine], 1-(3,5-dimethylbenzyl)-3,3-dimethylspiro [indoline-2,3'-(3H)naphtho(2,1-b)(1,4)-oxazine], 1-(4-chlorobenzyl)-3,3-dimethylspiro[indoline-2,3'-(3H)naphtho (2,1-b)(1,4)-oxazine] and 1-(2-fluorobenzyl)-3,3-dimethylspiro[indoline-2,3'-(3H)naphtho(2,1-b)(1,4)-oxazine]; 6'-piperidine-1,3,3-trimethylspiro[indoline-2,3'-(3H)naphtho(2,1-b)(1,4)-oxazine], 6'-indoline-1,3,3-trimethylspiro[indoline-2,3'-(3H)naphtho(2,1-b)(1,4)-oxazine], Examples of spiropyran-type compounds are 1-(2, 3,4,5-pentamethylbenzyl)-3,3-dimethylspiro[indoline-2,3'-(3H)naphtho(2,1-b)-pyran] and 1-(2-methoxy-5-nitrobenzyl)-3,3-dimethylspiro[indoline-2,3'-(3H)naphtho (2,1b)-pyran]. Examples of pyran type compounds include 2,2-di-p-methoxyphenylnaphtho (2,1-b)pyran, 2,2-di-p-methoxyphenylphenanthra (2,1-b)pyran, 2,2-diphenylnaphtho (2,1-b)pyran and 2,2-diphenylphenanthra (2,1-b)pyran.

Examples of thermochromic pigments suitable for the present invention include, but are not limited to, those disclosed in U.S. Pat. No. 4,957,949 to Kamada et al.

Examples of liquid crystal pigments suitable for the present invention include, but are not limited to, liquid crystal pigments from the Helicone HC® series made by Wacker Silicones Corporation in Michigan.

Resins may be used alone or in the form of a mixture to two or more resins. Resins suitable for use as the second resin in the present invention include, but are not limited to, thermoplastic, thermosetting, addition and condensation polymers. Illustrative examples include, but are not limited to, polyesters, polystyrene, high impact polystyrene, styrene copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyethylene, high density polyethylene, polypropylene, polyurethanes, rosin esters, hydrocarbon resins, copolymers, grafts, blends or mixtures thereof. The copolymers and blends of these polymers are well known to those skilled in the art, as are polymers which may serve as a backbone or a grafted polymer in graft polymers.

Alkyd resins are preferred resins for use in the non-fluorescent pigment dispersion of the present invention. Examples of alkyd resins useful in this invention are alkyd resins from Akzo Nobel (Matteson, Ill.), such as, AKA 1317, a #3 soya alkyd, AKA1275, a #7 super fluorite alkyd, AKA 1235, a high molecular weight #5 alkyd, AKA 1163, a #7 soya alkyd, AKA 1162, a metal decorating alkyd, AKA 1110, a #3 super fluorite alkyd, AKA 1109, a #1 super fluorite alkyd and AKA 1100, a #00 litho alkyd. More preferably the alkyd resins are oil modified or fatty acid modified alkyds.

Antioxidants may be used alone or in the form of a mixture to two or more antioxidants. Examples of antioxidants include, but are not limited to, are (1) hindered phenols [such as Alvinox 100 made by 3V inc. in Charlotte, N.C. or BNX 1000 made by Mayzo Inc in Norcross, Ga.) or BHT (butylated hydroxy toluene) made by Eastman Chemical Co. or Vanox SKT made by Vanderbilt Chemical Co in Connecticut.], (2) alkylidene bis, tris, and polyphenols [such as the Cyanox series (425, 1790, 2246) made by CYTEC in Perrysburg, Ohio], (3) thio bis, tris and polyalkylated phenols [such as Irganox 1035 made by Ciba Geigy in Basel, Switzerland], (4) amines [such as PTZ phenothiazine made by Zeneca Specialties in England or the Naugard series (A, J, Q, SA, 445) made by Uniroyal Chemical Co in Conn.], (5) esters [such as the Argus series (DLTDP, DSTDP, DMTDP, DTDTDP) Witco Polymer Additives in Greenwich, Conn.], (6) organic phosphites and phosphates [such the Albrite series (BTD HP, DBHP, DLHP) made by Albright & Wilson located in Richmond, Va.], (7) propyl gallate made by Eastman Chemical Co in Tenn., (8) hydroquinone made by Monsanto Chemical Co in St. Louis, Mo., (9) tocopherol, such as vitamin E and (10) eugenol (oil of cloves). Preferred antioxidants are Vitamin E sold by A.D.M. (Decatur, Ill.), BHT (butylated hydroxy toluene) sold by Eastman Chemical (Kingsport, Tenn.) and eugonol sold by Aldrich Chemical Co. (Milwaukee, Wiss.). Most preferred is BHT. Preferably, the antioxidant is present in the ink composition in amounts from about 0.1 to about 30 weight percent, most preferably from about 0.1 to about 10 weight percent.

UV absorbers may be used alone or in the form of a mixture to two or more UV absorbers. Examples of UV absorbers and light stabilizers include, but are not limited to, (1) 2-(2'-hydroxyphenyl)-benzotriazoles; (2) esters of substituted or unsubstituted benzoic acids, (3) 2-hydroxybenzophenones, (4) acrylates, (5) nickel compounds, such as nickel complexes of 2,2'-thiobis-[4-(1, 1,3,3-tetramethylbutyl)-phenol], nickel dibutyldithiocarbamate, nickel salts of monoalkyl 4-hydroxy-3,5-di-tert-butylbenzylphosphonates, nickel complexes of ketoximes, or nickel complexes of 1-phenyl-4-lauryl-5-hydroxypyrazole, (6) sterically hindered amines, such as, bis-(2,2,6,6-tetramethylpiperidyl) sebacate, and bis-(1,2,2,6,6-pentamethylpiperidyl)sebacate, and bis-(1,2,2,6,6-pentamethylpiperidyl) n-butyl-3,5-di-tert-butyi-4-hydroxybenzylmalonate; (7) oxamides and (8) 2-(2 hydroxyphenyl)-1,3,5-triazines.

Plasticizers may be used alone or in the form of a mixture to two or more plasticizers. Examples of plasticizers for use in this invention include, but are not limited to, derivatives of abietic, acetic acid, adipic acid, azelaic acid, benzoic acid, butiene, polyphenol, citric acid, epoxy, fumaric acid, glutaric acid, gycerine, glycol, linear dibasic acid, petroleum, isobutyric, isophthalte, lactam, maleic acid, myristic acid, nitrile, oleic acid, palmitic acid, paraffin, pelargonic acid, pentaerythritol, phenoxy, phosphoric acid, polyester, ricinoleic acid, sebacic acid, stearic acid, styrene, sucrose, sulfonic acid, tall oil, and trimellitate acid. Preferably, the plasticizer is 2,2,4-trimethyl-1,3-pentadiol diisobutyrate ("TXIB") sold by Eastman Chemical Co. (Kingsport, Tenn.). Preferably, the plasticizer is present in the ink composition in amounts from about 0.1 to about 40 weight percent, more preferably from about 1 to about 20 weight percent, most preferably from about 2 to about 15 weight percent.

Antiskinning agents may be used alone or in the form of a mixture to two or more antiskinning agents. An example of an antiskinning agent includes, but is not limited to the oxime family of organic compounds. Preferably, the antiskinning agent is methyl ethyl ketoxime sold by DMG Americas (Westlake, Ohio). Preferably the anti-skinning agent is present in the ink composition in amounts from about 0.1 to about 2 weight percent.

Lubricants may be used alone or in the form of a mixture to two or more lubricants. Examples of lubricants include, but are not limited to, (1) alcohol esters [tradename Flexricin P-1, P-4, P-6 made by CasChem in Newark, N.J.], (2) amides [tradename Crodamide EBS, EBO, ER made by Croda Universal Ins in Arlington, Tex.], (3) polyol esters [such as tradename Glycolube P made by Lonza in Fair Lawn, N.J.], (4) fatty acids [such as tradename Croacid made by Croda], (5) fatty alcohols [such as tradename Unilin 350, 425, 550 made by Petrolite Company in Okla.], (6) silicones [such as tradename 200, 203, MB50–001 fluids made by Dow Comning in Midland Mich.], (7) liquid polyolefins [such as VERSAFLOW made by Shamrock Chemical Co in Newark, N.J.] and (8) fatty acid metal salts such as zinc stearate made by Witco Corp in Greenwich, Conn. Preferably the lubricant is liquid polyethylene wax (Versaflow) available from Shamrock Chemicals Co. (Newark, N.J.). Preferably, the lubricant is present in the ink composition in amounts from about 0.1 to about 30 weight percent. More preferably, the lubricant is present in the ink composition in amounts from about 1 to about 15 weight percent.

Metal deactivators may be used alone or in the form of a mixture to two or more metal deactivators. Examples of metal deactivators include, but are not limited to, N,N'-diphenyloxamide, N-salicylal-N'-salicyloylhydrazine, N,N'-bis-(salicyloyl)-hydrazine, N,N'-bis-(3,5-di-tert-butyl-4-hydroxyphenylpropionyl)-hydrazine, 3-salicyloylamino-1,2,4-triazole, bis-(benzylidene)-oxalic acid dihydrazide, tradenames Citrosol 50W, 50T, 50E made by Pfizer Chemical Co in New Haven, Conn.; Cheelox HE-24, NTA-14 made by GAF Corporation in New Jersey and Chel DM-41, DPTA, Irganox 1024 made by Ciba Geigy in Basel, Switzerland).

Dispersing agents may be used alone or in the form of a mixture of two or more dispersing agents. Dispersing agents may be either anionic, nonionic or amphoteric. The anionic dispersant usable includes, for instance, sulfonated fatty acid ester such as dioctyl sodium sulfosuccinate, higher alcohol sulfate, polyoxyethylene alkyl phenyl ether sulfate, alkyl aryl sulfonate or olefin sulfonate. The nonionic dispersant usable in the present invention includes, for instance, polyoxyethylene ether compound such as polyoxyethylene alkyl ether or polyoxyethylene alkyl phenyl ether, polyhydric alcohol fatty acid ester or polyhydric alcohol fatty acid ester polyoxyethylene ether. The ink composition may contain a dispersing agent in an amount of not more than about 10 weight percent, preferably in the range of about 0.1 weight percent to about 5 weight percent, based on the ink composition.

Additional components which can be added to the ink compositions of the present invention include fillers, surfactants and optical brighteners. The total amount of such additional components is typically from about 0.1 weight percent to about 30 weight percent and preferably, from about 1 weight percent to about 15 weight percent.

In another embodiment of the present invention, a wtiting instrument comprises an ink storage member or tube containing inks of the present invention. An ink storage member or tube may be made from any of the following polymer materials: polyesters, polystyrene, high impact polystyrene, styrene copolymers, acrylonitrile butadiene copolymers, polyisobutylene, vinyl, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, such as nylon, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, fluoropolymers, copolymers, grafts, blends or mixtures thereof. Also, any ink member or tube made from the polymers listed above may also be modified with surface treatments such as fluorination, corona oxidation and the like to improve performance of the ink delivery. Preferably, the ink storage member is made of a polymer material such as fluoropolymer, vinyl, nylon and fluorinated polypropylene. Most preferably, the polymer material is a fluoropolymer such as fluorinated ethylenepropylene or "FEP," from Dupont.

EXAMPLES

The ink compositions of the present invention are best described by using the following examples; however, the invention is not limited thereto. All components are listed as parts by weight (pbw) unless otherwise noted.

Example 1

Metallic Ink for Writing Instruments

Examples of metallic inks of the present invention were formulated as shown in Table 1.

TABLE 1

| COMPONENTS | A | B | C |
|---|---|---|---|
| Unipak 9401* | 100 pbw | | |
| Unipak 9400** | | 100 | |
| 8677 PMS 877*** | | | 100 |
| Magiesol 62**** | 20 | 20 | 20 |
| BHT***** | 1 | 1 | 1 |

*made by MD-BOTH Industries in West Chicago, IL. Unipak 9401 is a fine particle size brass flake dispersed in an alkyd resin and high boiling middle distillate solvent.
**made by MD-BOTH Industries in West Chicago, IL. Unipak 9400 is a fine particle size brass flake dispersed in an alkyd resin and high boiling middle distillate solvent.
***made by MD-BOTH Industries in West Chicago, IL. 8677 PMS 877 is a fine particle size aluminum flake dispersed in an alkyd resin and high boiling middle distillate solvent.
****made by Magie Brothers Oil Company in Franklin Park, IL.
*****BHT (butylated hydroxy toluene) is made by Uniroyal Chemical Company in Naugatuck, CT.

Example 2

Organic Pigment Ink for Writing Instruments

Examples of organic pigment inks of the present invention were formulated as shown in Table 2.

TABLE 2

| COMPONENTS | A | B | C | D |
|---|---|---|---|---|
| 66S701* | 100 pbw | | | |
| 13L540** | | 100 | | |
| 13L520*** | | | 100 | |
| 13L510**** | | | | 100 |
| Magiesol 62***** | 31 | 28 | 21 | 26 |
| Hydroquinone****** | 1 | 1 | 1 | 1 |

*made by Hilton Davis Chemical Company in Cincinnati, Ohio. 66S701 is a phthalocyanine blue pigment dispersed in a soya oil alkyd resin with a hydrocarbon resin in soya oil.
**made by Hilton Davis Chemical Company in Cincinnati, Ohio. 13L540 is a phthalocyanine green pigment dispersed in an oil-modified alkyd resin with a hydrocarbon resin in Magiesol 52 oil.
***made by Hilton Davis Chemical Company in Cincinnati, Ohio. 13L520 is an organic yellow pigment (Pigment Yellow 74) dispersed in an oil-modified alkyd resin with a hydrocarbon resin in Magiesol 52 oil.
****made by Hilton Davis Chemical Company in Cincinnati, Ohio. 13L510 is red organic pigment (napthol red) dispersed in an oil-modified alkyd resin with a hydrocarbon resin in Magiesol 52 oil.
*****made by Magie Brothers Oil Company in Franklin Park, IL.
******made by Eastman Chemical Company in Kingsport, TN.

Example 3

Inorganic Pigment Ink for Writing Instruments

Examples of inorganic pigment inks of the present invention were formulated as shown in Table 3.

TABLE 3

| COMPONENTS | A | B | C | D |
|---|---|---|---|---|
| Magnakyd 6/LO/PX1459* | 100 pbw | | | |
| Magnakyd 42T/LO/PX1465** | | 100 | | |
| Magnakyd 101T/LO/PX1463*** | | | 100 | |
| Magnakyd 7LF/LO/PX1481**** | | | | 100 |

TABLE 3-continued

| COMPONENTS | A | B | C | D |
|---|---|---|---|---|
| Magiesol 62***** | 16 | 21 | 18 | 24 |
| Vitamin E****** | 1 | 1 | 1 | 1 |

*made by Runnymede Dispersions Ltd. (England). Magnakyd 6/LO/PX1459 is a rutile titanium dioxide pigment dispersed in an oil-modified alkyd resin in a mineral oil.
**made by Runnymede Dispersions Ltd. (England). Magnakyd 42T/LO/PX1465 is a iron oxide yellow pigment (pigment yellow 42) dispersed in an oil-modified alkyd resin in a mineral oil.
***made by Runnymede Dispersions Ltd. (England). Magnakyd 101T/LO/PX1463 is an iron oxide red pigment (pigment red 101) dispersed in an oil-modified alkyd resin in a mineral oil.
****made by Runnymede Dispersions Ltd. (England). Magnakyd 7LF/LO/PX1481 is a carbon black pigment (pigment black 7) dispersed in an oil-modified alkyd resin in a mineral oil.
*****Magiesol 62 is a solvent made by Magie Brothers Oil Company in Franklin Park, IL.
******made by ADM Company in Decatur, IL.

All patents cited in the foregoing text are expressly incorporated herein by reference in their entirety It will be understood that the claims are intended to cover all changes and modifications of the preferred embodiments of the invention, herein chosen for the purpose of illustration, which do not constitute a departure from the spirit and scope of the invention.

We claim:

1. A non-fluorescent ink composition for a writing instrument comprising a non-fluorescent pigment pre-dispersed in an alkyd resin, a high boiling point hydrocarbon solvent, and at least one stabilizer selected from the group consisting of antioxidants and anti-skinning agents, wherein the stabilizer of the ink composition prevents the alkyd resin from polymerizing, and the ink composition has a viscosity usable for a writing instrument.

2. A non-fluorescent ink composition of claim 1, wherein the viscosity is less than 500,000 cPs at 20° C.

3. A non-fluorescent ink composition of claim 2, wherein the ink composition has a viscosity from about 1000 to about 50,000 cPs at 20° C.

4. The ink composition of claim 1, wherein the composition is a heterogeneous ink composition.

5. The ink composition of claim 1, further comprising a second resin.

6. The ink composition of claim 5, wherein the second resin is present in an amount from about 0.1 to about 50 weight percent of the ink composition.

7. The ink composition of claim 6, wherein the second resin is present in an amount from about 1 to about 20 weight percent of the ink composition.

8. The ink composition of claim 5, wherein the second resin is selected from the group consisting of polyesters, polystyrene, high impact polystyrene, styrene copolymers, acrylonitrile butadiene copolymers, polyisobutylene, polyvinyl chloride, polyvinylidene chloride, polyvinyl acetals, polyacrylonitrile, polyacrylates, polymethacrylates, polymethylmethacrylates, polybutadiene, ethylene vinyl acetate, polyamides, polyimides, polyoxymethylene, polysulfones, polyphenylene sulfide, polyvinyl esters, melamines, vinyl esters, epoxies, polycarbonates, polyurethanes, polyether sulfones, polyacetals, phenolics, polyester carbonate, polyethers, polyethylene terephthalate, polytrimethylene terephthalate, polybutylene terephthalate, polyarylates, polyarylene sulfides, polyketones, polyethylene, high density polyethylene, polypropylene, rosin esters, hydrocarbon resins, copolymers thereof, grafts thereof, blends thereof, and mixtures thereof.

9. The ink composition of claim 1, wherein the hydrocarbon solvent has a boiling point above 100° C.

10. The ink composition of claim 1, wherein the hydrocarbon solvent is selected from the group consisting of aliphatic hydrocarbons, naphthenic hydrocarbons, aromatic hydrocarbons and mixtures thereof.

11. The non-fluorescent ink composition of claim 1, wherein the hydrocarbon solvent is from about 1 to about 90 weight percent of the ink composition.

12. The non-fluorescent ink composition of claim 11, wherein the hydrocarbon solvent is from about 20 to about 65 weight percent of the ink composition.

13. The ink composition of claim 1, wherein the stabilizer is an antioxidant.

14. The ink composition of claim 13, wherein the antioxidant is selected from the group consisting of tocopherals, butylated hydroxy toluene, eugenol and hydroquinone.

15. The ink composition of claim 13, wherein the antioxidant is present in an amount from about 0.1 to about 30 weight percent of the ink composition.

16. The ink composition of claim 1, further comprising a plasticizer.

17. The ink composition of claim 16, wherein the plasticizer is 2,2,4-methyl-1,2-pentanediol diisobutyrate.

18. The ink composition of claim 16, wherein the plasticizer is present in amounts from about 0.1 to about to about 40 weight percent of the ink composition.

19. The ink composition of claim 18, wherein the plasticizer is present in amounts from about 1 to about 20 weight percent of the ink composition.

20. The ink composition of claim 19, wherein the plasticizer is present in amounts from about 2 to about 15 weight percent.

21. The ink composition of claim 1, wherein the stabilizer is an antiskinning agent.

22. The ink composition of claim 21, wherein the antiskinning agent is an oxime.

23. The ink composition of claim 21, wherein the antiskinning agent is methyl ethyl ketoxime.

24. The ink composition of claim 21, wherein the antiskinning agent is present in amounts from about 0.1 to about 2 weight percent of the ink composition.

25. The ink composition of claim 1, further comprising a lubricant.

26. The ink composition of claim 25, wherein the lubricant is selected from the group consisting of amides, silicones, liquid polyolefins and fatty acid metal salts.

27. The ink composition of claim 25, wherein the lubricant is liquid polyethylene wax.

28. The ink composition of claim 25, wherein the lubricant is present in an amount from about 0.1 to about 30 weight percent of the ink composition.

29. The ink composition of claim 28, wherein the lubricant is present in an amount from about 1 to about 15 weight percent of the ink composition.

30. The non-fluorescent ink composition of claim 1, wherein the non-fluorescent pigment is present in the ink composition in an amount from about 0.1 to about 60 weight percent of the ink composition.

31. The ink composition of claim 1, wherein the non-fluorescent pigment is selected from the group consisting of organic pigments, inorganic pigments, metallic pigments, phosphorescent pigments, photochromic pigments, thermochromic pigments, iridescent pigments, pearlescent pigments and liquid crystal pigments.

32. The ink composition of claim 31, wherein the non-fluorescent pigment is a pearlescent pigment.

33. The ink composition of claim 31, wherein the non-fluorescent pigment is a metallic flake pigment.

34. The ink composition of claim 1 wherein the writing instrument is a ball point pen.

35. A non-fluorescent ink composition for a writing instrument comprising a non-fluorescent pigment pre-dispersed in an oil-modified alkyd resin, at least one stabilizer selected from the group consisting of antioxidants and anti-skinning agents, and a high boiling point hydrocarbon solvent, wherein the stabilizer of the ink composition prevents the oil-modified alkyd resin from polymerizing, and the ink composition has a viscosity usable for a writing instrument.

36. The ink composition of claim 35, wherein the composition is a heterogeneous ink composition.

37. The ink composition of claim 35, wherein the organic solvent has a boiling point above 100° C.

38. The ink composition of claim 35, wherein the writing instrument is a ball point pen.

* * * * *